(12) United States Patent
Loos et al.

(10) Patent No.: US 11,972,535 B2
(45) Date of Patent: Apr. 30, 2024

(54) METHOD AND SYSTEM FOR VISUALISING COLOCALISED FLUORESCENCE SIGNALS

(71) Applicant: STELLENBOSCH UNIVERSITY, Stellenbosch (ZA)

(72) Inventors: Benjamin Loos, Cape Town (ZA); Thomas Richard Niesler, Stellenbosch (ZA); Rensu Petrus Theart, Stellenbosch (ZA)

(73) Assignee: STELLENBOSCH UNIVERSITY, Stellenbosch (ZA)

(*) Notice: Subject to any disclaimer, the term of this patent is extended or adjusted under 35 U.S.C. 154(b) by 89 days.

(21) Appl. No.: 17/605,315

(22) PCT Filed: Apr. 3, 2020

(86) PCT No.: PCT/IB2020/053189
§ 371 (c)(1),
(2) Date: Oct. 21, 2021

(87) PCT Pub. No.: WO2020/217123
PCT Pub. Date: Oct. 29, 2020

(65) Prior Publication Data
US 2022/0189129 A1    Jun. 16, 2022

(30) Foreign Application Priority Data
Apr. 23, 2019 (ZA) .............................. 2019/02511

(51) Int. Cl.
*G06T 19/20* (2011.01)
*G01N 21/64* (2006.01)

(52) U.S. Cl.
CPC ......... *G06T 19/20* (2013.01); *G01N 21/6458* (2013.01); *G06T 2219/2012* (2013.01)

(58) Field of Classification Search
None
See application file for complete search history.

(56) References Cited

U.S. PATENT DOCUMENTS

2007/0236491 A1* 10/2007 Hundley ............... A61B 6/466
                                                          345/418
2014/0016168 A1*  1/2014 Marandi ................. G06E 1/00
                                                          359/107

(Continued)

OTHER PUBLICATIONS

International Search Report and Written Opinion issued in PCT/IB2020/053189, dated May 28, 2020, 9 pages.

(Continued)

*Primary Examiner* — Kee M Tung
*Assistant Examiner* — Jed-Justin Imperial
(74) *Attorney, Agent, or Firm* — Meunier Carlin & Curfman LLC

(57) ABSTRACT

A computer-implemented method and a system are provided for visualising colocalised fluorescence signals. The method accesses signal intensity data obtained from a first fluorescence channel and a second fluorescence channel in which the signal intensity data is associated with voxels in an image. A regression factor on the signal intensity data is calculated to generate a regression parameter corresponding to a degree of correlation between the signal intensity data obtained from the first and second fluorescence channels The signal intensity data is mapped to the regression parameter and colourmap values are assigned to each voxel based on the mapped signal intensity data in which colourmap values of voxels embodying poorly correlated signal intensity data are reduced. The method renders the voxels in the image in colours according to their colourmap values to visualise colocalisation in the image.

14 Claims, 11 Drawing Sheets

(56) References Cited

U.S. PATENT DOCUMENTS

2017/0011012 A1* 1/2017 Das ..................... G06T 7/0002
2017/0283881 A1* 10/2017 Tajbakhsh ........ G01N 33/57423

OTHER PUBLICATIONS

Jorge Ignacio Villalta et al: "New Algorithm to Determine True Colocalization in Combination with Image Restoration and Time-Lapse Confocal Microscopy to Map Kinases in Mitochondria", PLOS ONE, vol. 6, No. 4, Apr. 29, 2011.

Jeremy Adler et al: "Quantifying colocalization: Thresholding, Void Voxels and the Hcoef", PLoS ONE, Jan. 1, 2014 (Jan. 1, 2014), pp. 1-11, DOI: 10.1371 /journal.pone Retrieved from the Internet: URL:https://journals.plos.org/plosone/article/file?id=10.1371/journal.pone.0111983&type=printable [retrieved on May 28, 2020].

Jesse S. Aaron et al: "Image co-localization—co-occurrence versus correlation", Journal of Cell Science, vol. 131, No. 3, Feb. 1, 2018 (Feb. 1, 2018).

* cited by examiner

METHOD AND SYSTEM FOR VISUALISING COLOCALISED FLUORESCENCE SIGNALS

CROSS-REFERENCE(S) TO RELATED APPLICATIONS

This application claims priority from South African provisional patent application number 2019/02511 filed on 23 Apr. 2019, which is incorporated by reference herein.

FIELD OF THE INVENTION

This invention relates to a me and system for visualising colocalised fluorescence signals in an image of a sample, such as a biological sample. The fluorescence signals may typically be obtained by fluorescence microscopy.

BACKGROUND TO THE INVENTION

Fluorescence microscopy is a major driving force in modern biology and medicine. Imaging of fluorescence signals is commonly carried out in biological sciences for investigating localisation of proteins, receptors, organelles, cells, etc. Researchers are often required to establish whether two molecules of interest are located in the same area (i.e., whether they are colocalised). Colocalisation can be defined as the presence of two or more different molecules in close spatial positions in a sample. Typically, colocalisation is viewed as the geometric codistribution of two fluorescence colour channels (also referred to as signals) typically produced by fluorescing probes. Colocalisation imaging provides critical information indicating whether two structures of interest associate with one another. This is important for the understanding of biological processes and cellular functions. However, the objective of colocalisation imaging is usually not merely to consider the spatial overlap of two colour channels, since this would include coincidental overlap. Instead, it is of much greater importance to consider the correlation, or the proportional overlap, of two colour channels within and between structures. Therefore, for many colocalisation applications, it is desirable to accurately quantify the degree of colocalisation in the sample as well as to clearly assess the location and intensity thereof. A common approach to quantifying colocalisation is the calculation of several colocalisation metrics, each of which highlights a particular aspect of the colocalisation and signal distribution in the entire sample. Some of the most notable and widely utilized among these metrics are the Pearson correlation coefficient (PCC), the Manders Overlap coefficient (MOC) and the Manders correlation coefficient (MCC). Although these measures are effective for the comparison of colocalisation between samples, especially when coupled with region of interest (ROI) selection, they are less suitable to convey any spatial information. Therefore, since sample investigations often require an understanding of how a fluorescence signal distributes throughout intracellular regions, another frequent approach to the analysis of colocalisation is by means of visualisation. Often this is achieved by overlaying the two fluorescence channel images and observing regions of overlap. For example, in the case of a red and green channel combination, the overlapping regions will be visualised in yellow. Although this approach provides a rapid overview of potentially colocalised signals, the ability to observe such yellow areas is highly dependent on the relative signal intensity of each channel. This is problematic since the intensity dynamics are rarely similar across different samples acquired through fluorescence microscopy.

Another common approach is to visualise the colocalised signal distribution by means of a binary mask superimposed as a single colour (often white) directly onto the sample. In this visualisation approach only the location of the colocalisation is visualised. Limited or no indication is provided of the underlying intensities resulting in the observed colocalisation, or of the extent of the correlation between the channels. Furthermore, visualisation of spatial colocalisation is most often performed two-dimensionally (2D) and only limited work has been undertaken to allow visualisation in three-dimensional (3D) space.

Several existing approaches consider the spatial quantification of the colocalisation signal interaction in a sample, with each designed to highlight a certain aspect of the colocalisation.

With the aim of improving the identification of colocalised structures at a subcellular level, an approach has been proposed using an enhanced colocalisation visualisation using a specifically designed dual-channel look-up table (LUT) that maps fluorescence channel visualisations from Texas Red to magenta and fluorescein isothiocyanate (FITC) to cyan. Red was used to indicate colocalised voxels that have a greater intensity in the Texas Red channel, green was used to indicate colocalised voxels that have greater intensities in the FITC channel and yellow was used when both intensities were similar. In this way the relative intensities of the fluorescence channels in the colocalised voxel could be better discriminated.

Building on this work, two subsequent colocalisation visualisation methods were proposed, each having the advantage of not relying on the balanced staining of cells to ensure similar fluorescence signal intensities in both channels. These methods were named the covariance method, which is a spatial representation of the PCC, and the multiply method, which is a spatial representation of MOC. Pixels having the greatest influence on the metrics are identified by visualising only those falling within the $99^{th}$ percentile. In a similar way, several colocalisation metrics as well as the product of the PCC and MOC spatial maps can be visualised in what is referred to as a mixed map. The mixed map is used in an iterative classification process to generate a colocalisation map that is a better approximation of the true colocalisation, as opposed to the coincidental colocalisation, thereby minimizing the visualisation of false positives.

A currently very prominent approach to the visualisation of colocalisation provides a spatial representation of the correlation between two fluorescence signals, similar to the spatial representation of the PCC by the methods described above. For each pixel in the sample, a quantity termed the normalized mean deviation product (nMDP) is calculated. The nMDP is defined as:

$$nMDP_{P_i} = \frac{(x_i - \bar{x})(y_i - \bar{y})}{(x_{P_{max}} - \bar{x})(y_{P_{max}} - \bar{y})} \quad (1)$$

with $x_i$ and $y_i$ representing the fluorescence intensities of the two colour channels for the ith pixel in the sample image, $\bar{x}$ and $\bar{y}$ representing the mean channel intensities and $x_{\mu max}$ and $y_{\mu max}$ representing the maximum channel intensities.

To calculate the mean and maximum channel intensities required in Equation 1, a Sobel filter is applied to each colour channel of the image in order to make a region of interest (ROI) selection. In this way background intensities are removed independently for each colour channel of the image. In the numerator of Equation1, the product of the deviations from the mean within the ROI is calculated for fluorescence channels x and y. This product is then normalized by the product of the deviations of the maximum intensities from the respective means over the entire image. Using this Equation, a new pseudo-colour image is generated that represents the degree to which colocalisation or non-colocalisation occurs at each pixel. The nMDP value can be either positive or negative, based on the intensity of the pixel relative to the mean. In this way, positive values indicate that the pixel is colocalised and negative values indicate that it is not.

All of the preceding methods aim to improve the spatial analysis of colocalisation by augmenting the standard visualisation of the overlap between two fluorescence channels in their original colours. Some attempt to introduce a visual representation of the correlation between the channels into the visualisation, by assigning a colour to each voxel based on its individual contribution to the PCC. This can however introduce inconsistencies into the interpretation of the visualisation.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to an aspect of the present invention there is provided a computer-implemented method for visualising colocalised fluorescence signals in fluorescence microscopy of a sample comprising: accessing fluorescence data in a three-dimensional form including signal intensity data for a first fluorescence channel and a second fluorescence channel associated with each voxel of an image; calculating a regression on the fluorescence data to generate a regression parameter corresponding to a degree of correlation between the signal intensity data obtained from the first and second fluorescence channels; mapping the signal intensity data for each voxel to the regression parameter; assigning a colourmap value to each voxel based on the mapping; and rendering the voxels in the image in colours related to the assigned colourmap values resulting in a visualisation of colocalisation of the fluorescence data in the image.

The computer-implemented method may comprise: mapping the signal intensity data to the regression parameter, assigning colourmap values to the voxels based on the mapped signal intensity data in which colourmap values of voxels embodying poorly correlated signal intensity data are reduced, and rendering an image comprising the voxels in which the voxels are coloured according to their colourmap values to visualise colocalisation of the image data.

Assigning a colourmap value to each voxel may further include: assigning a colourmap value based on a level of combined channel signal intensities to emphasise greater signal intensities; and limiting assigning colourmap values to voxels where both channel signal intensities are above defined respective channel intensity thresholds.

Mapping may apply a perpendicular projection of the signal intensity data for a voxel onto the regression parameter; and wherein assigning a colourmap value to each voxel includes: assigning a colourmap value based on a position along the regression parameter; and attenuating the colourmap value based on an increased distance of the projection to emphasize positively correlated intensities.

Assigning a colourmap value to each voxel may further include: excluding assigning colourmap values to outliers in the data, wherein outliers are signal intensity data that is greater than a predetermined distance threshold from the regression parameter. The mapping may include a statistical filter to apply a projection distance threshold to capture a statistical population of voxels having intensities above defined respective channel intensity thresholds.

In one embodiment, the regression may be an errors-in-variables regression and values of the regression parameter may be represented by a best fit line of points on a graph with axes representing the signal intensity values of the first and second fluorescence channels with colourmap values varying along the regression parameter line. For example, the errors-in-variables regression may be Deming regression, and fthe Deming regression may be an orthogonal regression.

The regression parameter may have an upper limit corresponding to a maximum signal intensity of at least one of the first and second fluorescence channels and a lower limit corresponding to a minimum signal intensity of at least one of the first and second fluorescence channels, and wherein assigning colourmap values is applied linearly between the parameter upper limit and lower limit along the regression parameter. The assigned colourmap values may be between an upper threshold value and a lower threshold value, for example, the upper threshold value may be 1 and the lower threshold value to be 0 so that all of the mapped signal intensity data is assigned a colourmap value of between 0 and 1. Signal intensity data having a mapped value that exceeds the upper limit of the regression parameter may be assigned a colourmap value corresponding to the upper threshold value and signal intensity data having a mapped value that is less than the lower limit of the regression parameter may be assigned a colourmap value corresponding to the lower threshold value.

The method may also include: applying a threshold filter to exclude signal intensity data corresponding to background noise or non-correlated signal intensity data; wherein background noise comprises signal intensity data below a threshold filter minimum, and non-correlated signal intensity data comprises data from at least one of the first and second fluorescence channels which is below a threshold filter minimum. Different threshold filters may be applied to the first fluorescence channel data and the second fluorescence channel data, alternatively the same threshold filter may be applied to the first fluorescence channel data and the second fluorescence channel data, and the threshold filter may be manually determined or automatically determined.

Yet further features provide for the method to include excluding outliers in the data from being visualised in the rendered image, for the outliers to be signal intensity data that is greater than a predetermined distance threshold from the regression parameter, for the predetermined distance threshold to correspond to between 50% and 100% of the signal intensity data which is greater than the threshold filters of the first and second fluorescence channels, such as 99% of the signal intensity data which is greater than the threshold filters, and for the predetermined distance threshold to be automatically determined or manually determined.

Even further features provide for the colourmap values of voxels embodying poorly correlated signal intensity data to be reduced in proportion to their distance from the regression parameter, for the signal intensity data of all voxels to be reduced by a factor of d x tan θ, where d is the distance of the voxel from the regression parameter and 0<θ<90.

According to another aspect of the present invention there is provided a computer system comprising: a processor and a memory configured to provide computer program instructions to the processor to execute functions of components: an accessing component for accessing fluorescence data in a three-dimensional form including signal intensity data for a first fluorescence channel and a second fluorescence channel associated with each voxel of an image; a regression calculating component for calculating a regression on the fluorescence data to generate a regression parameter corresponding to a degree of correlation between the signal intensity data obtained from the first and second fluorescence channels; a mapping component for mapping the signal intensity data for each voxel to the regression parameter; a colourmap value assigning component for assigning a colourmap value to each voxel based on the mapping; and a rendering component for rendering the voxels in the image for display on a computer display in colours related to the assigned colourmap values resulting in a visualisation of colocalisation of the fluorescence data in the image.

The colourmap value assigning component may include: assigning a colourmap value based on a level of combined channel signal intensities; and limiting assigning colourmap values to voxels where both channel signal intensities are above defined respective channel intensity thresholds. The colourmap value assigning component may also include: assigning colourmap values excluding outliers in the data, wherein outliers are signal intensity data that is greater than a predetermined distance threshold from the regression parameter. The mapping component may include a statistical filter to apply a projection distance threshold to capture a statistical population of voxels having intensities above defined respective channel intensity thresholds.

The system may also include a threshold filter component to exclude signal intensity data corresponding to background noise or non-correlated signal intensity data; wherein background noise comprises signal intensity data below a threshold filter minimum, and non-correlated signal intensity data comprises data from at least one of the first and second fluorescence channels which is below a threshold filter minimum.

Further features provide for the system to include a threshold applying component for applying a threshold filter to the data to exclude voxels associated with signal intensity data corresponding to background noise or non-correlated signal intensity data, for background noise to comprise signal intensity data below a threshold filter minimum, and for non-correlated signal intensity data to comprise data from at least one of the first and second fluorescence channels which is below a threshold filter minimum, for the threshold applying component to apply different threshold filters to the first fluorescence channel data and the second fluorescence channel data, alternatively the same threshold filter to the first fluorescence channel data and the second fluorescence channel data, and for the threshold filter to be manually determined, alternatively for the threshold filter to be automatically determined.

Still further features provide for the system to include an excluding component for excluding outliers in the data from being visualised in the rendered image, for the outliers to be signal intensity data that is greater than a predetermined distance threshold from the regression parameter, for the predetermined distance threshold to correspond to between 50% and 100% of the signal intensity data which is greater than the threshold filters of the first and second fluorescence channels, such as 99% of the signal intensity data which is greater than the threshold filters, and for the predetermined distance threshold to be automatically determined or manually determined.

According to a further aspect of the present invention there is provided a computer program product comprising a computer-readable medium having stored computer-readable program code for performing the steps of: accessing fluorescence data in a three-dimensional form including signal intensity data for a first fluorescence channel and a second fluorescence channel associated with each voxel of an image; calculating a regression on the fluorescence data to generate a regression parameter corresponding to a degree of correlation between the signal intensity data obtained from the first and second fluorescence channels; mapping the signal intensity data for each voxel to the regression parameter; assigning a colourmap value to each voxel based on the mapping; and rendering the voxels in the image in colours related to the assigned colourmap values resulting in a visualisation of colocalisation of the fluorescence data in the image.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

The present disclosure provides a computer-implemented method, system and computer program product for visualising colocalisation in fluorescence image data. In the described method, system and product, fluorescence image data obtained at two fluorescence channels (each corresponding to a different fluorophore in the sample) is manipulated to enable rendering of a 3D image that displays the shape, location and intensity of points of colocalisation. The image data is preferably obtained in three dimensional (3D) z-stack form corresponding to a combination of stacked 2D images taken along a z-axis of the sample. The image data contains a fluorescence signal intensity value for each of the channels in each voxel (a 3D volume pixel) making up the rendered image.

When investigating colocalisation, usually the correlation and not merely the co-occurrence of fluorescence channel intensities is of interest. The intensity of a fluorescence channel of an image is dependent mainly on the abundance of the fluorochrome (or fluorophore) in that region of the cell. Therefore, when two proteins or structures of interest associate with one another, their fluorescence signals will usually have similar intensities in the same voxels of the image. The present disclosure provides a means of spatially visualising the correlation between the two fluorescence channel intensities, specifically the degree to which colocalised voxels are positively correlated.

The fluorescence intensities for each voxel may be represented by two random variables X and Y, which may be discrete and may have values between 0 and 255. For a given voxel i in the image, this pair of intensities may be referred to as the colocalisation intensity $q_i$ and may be defined as a function of $x_i$, the intensity values of a first fluorescence channel, and $y_i$, the intensity values of a second fluorescence channel. A mapping using the two channel intensities is applied and a colour assigned to the image voxels.

Figure 1:
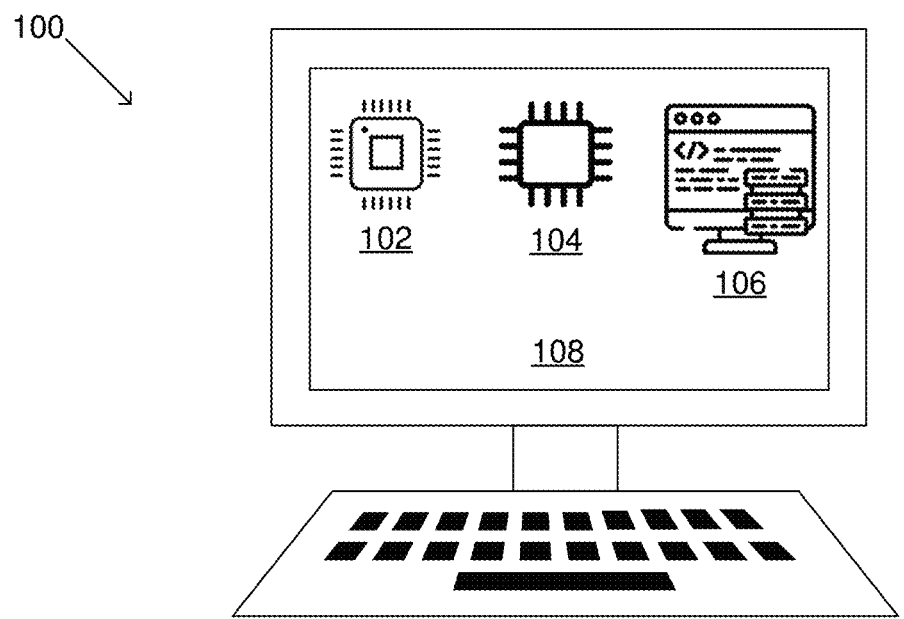
FIG. 1 is a schematic diagram which illustrates an exemplary system (100) for visualising colocalisation in fluorescence image data according to the present disclosure.

FIG. 1 is a schematic diagram which illustrates an exemplary system (100) for visualising colocalisation in fluorescence image data according to the present disclosure. The system (100) may include a processor (102) and a memory (104) configured to provide computer program instructions (106) to the processor (102) to execute functions of components of the system (100). The system (100) may be provided by one or more hardware or software units. In some cases, the system may be provided by a computing device (108). The system (100) may implement a method for visualising colocalisation in fluorescence image data and rendering the image including the colocalization visualisation on a computer display.

Figure 2:
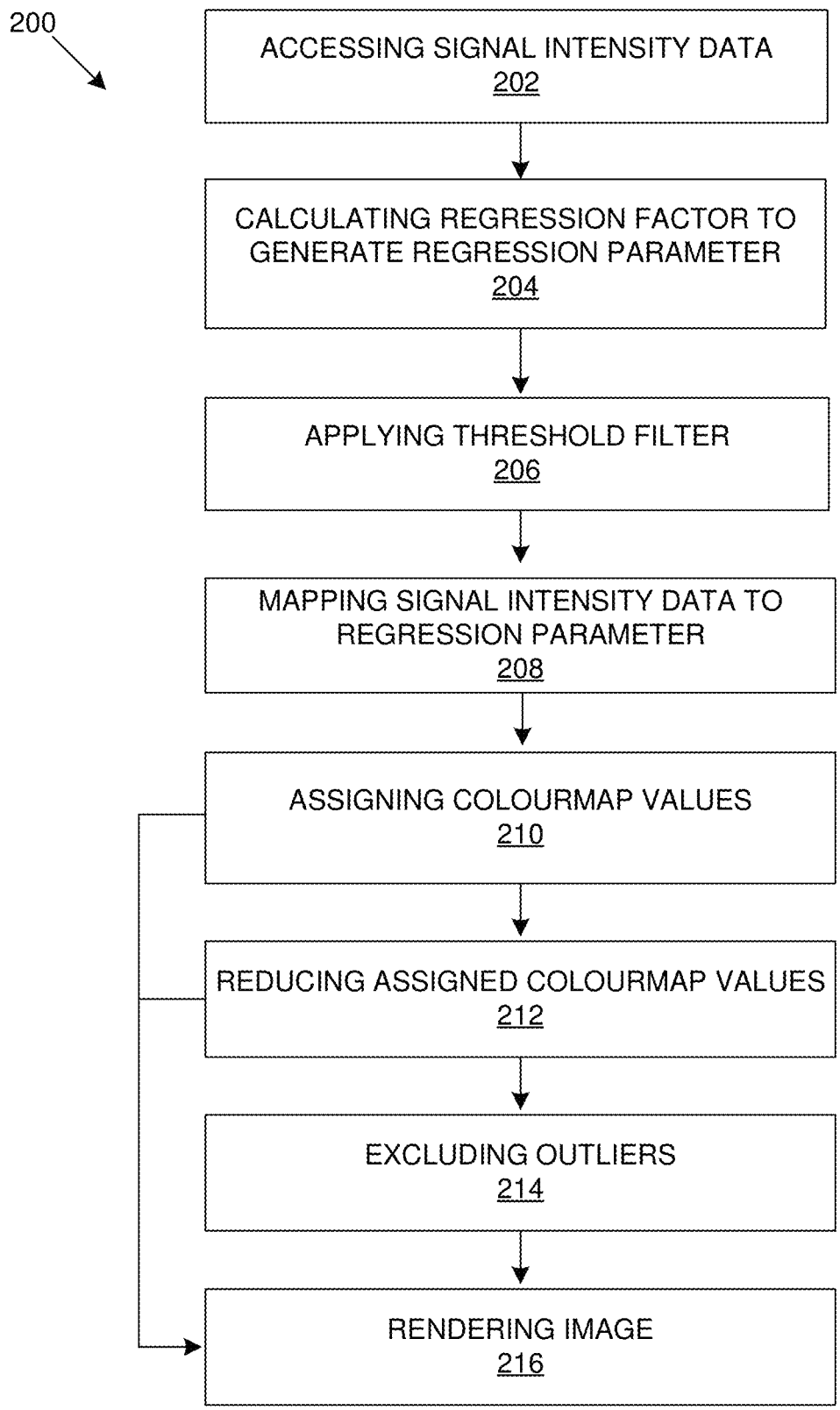
FIG. 2 is a flow diagram illustrating an exemplary method (200) for visualising colocalisation in fluorescence image data according to the present disclosure.

An exemplary computer-implemented method (200) is illustrated in the flow diagram of FIG. 2 for visualising colocalised fluorescence signals in fluorescence microscopy of a sample. The method (200) may include accessing (202) fluorescence data in a three-dimensional form including signal intensity data for a first fluorescence channel and a second fluorescence channel associated with each voxel of an image. The signal intensity data may typically be obtained from both a first fluorescence channel and a second fluorescence channel in which each fluorescence channel corresponds with fluorescence signals emitted by a different fluorophore in the sample. The signal intensity data of each fluorescence channel may typically be recorded at different wavelengths so that the signals from the channels may be differentiated from each other. The signal intensity data may be associated with voxels in an image, such as a 3D z-stack image, so that each voxel is associated with signal intensity values from each of the first and second fluorescence channels.

The method may include calculating (204) a regression factor on the signal intensity data to generate a regression parameter. The regression parameter may correspond to a degree of correlation between the signal intensity data obtained from the first and second fluorescence channels and may be generated in the form of a best fit line, such as a straight line, although in some embodiments the best fit line may be curved or wave-like. The regression factor may describe a linear relationship between the two fluorescence channel intensities. Simple linear regression may not be suitable for this task, as accompanying assumptions of ordinary least squares fit may not hold for colocalisation intensities. Specifically, an assumption that one variable (the dependent variable) can be predicted from another (the independent variable), and hence that the independent variable is a fixed, known constant, may not hold. Instead, both fluorescence intensities may be sampled and may be prone to observation errors. Therefore, the regression factor may be an errors-in-variables regression factor in which errors in measurements of the first and second fluorescence channels are accounted for. The errors-in-variables regression may be Deming regression and in some embodiments, the Deming regression may be orthogonal Deming regression. For Deming regression, the regression parameter is a line of best fit which may be described by:

$$Y = \beta_0 + \beta_1 x \quad (2)$$

where x and y are the true values of the two fluorescence channel intensities and where $\beta_0$ and $\beta_1$ are the intercept and slope of the regression line, respectively. However, since the measured intensities $\hat{x}$ and $\hat{y}$, have associated measurement errors $\epsilon_i$ and $\eta i$, the true values are related to the measurements by:

$$\hat{x}_i = x_i + \eta_i, \hat{y}_i = y_i + \epsilon_i \quad (3)$$

In Deming regression it is assumed that the ratio of the variances of these two errors is known, and is defined as:

$$\lambda = \frac{\sigma_\eta^2}{\sigma_\epsilon^2} \quad (4)$$

Since the measurements of the two channel intensities are typically made under the same conditions, it may be assumed that the variances of the two errors are similar, and hence that $\sigma_\eta^2 \approx \sigma_\epsilon^2$ and $\lambda \approx 1$. The method may therefore use $\lambda = 1$, which corresponds to a special case of Deming regression known as orthogonal regression. In order to estimate $\beta_1$, the sample mean and covariance of the random variables X and Y (corresponding to signal intensity data from each fluorescence channel) must first be calculated as followed:

$$\bar{x} = \frac{1}{n}\Sigma_{i=1}^n x_i, \bar{y} = \frac{1}{n}\Sigma_{i=1}^n y_i \quad (5)$$

$$s_{xx} = \frac{1}{n-1}\Sigma_{i=1}^n (x_i - \bar{x})^2, s_{yy} = \frac{1}{n-1}\Sigma_{i=1}^n (y_i - \bar{y})^2 \quad (6)$$

$$s_{xy} = \frac{1}{n-1}\Sigma_{i=1}^n (x_i - \bar{x})(y_i - \bar{y}) \quad (7)$$

Then, $\beta_0$ and $\beta_1$ can be estimated according to the equation:

$$\widehat{\beta_1} = \frac{\lambda s_{yy} - s_{xx} \pm \sqrt{(\lambda s_{yy} - s_{xx})^2 + 4\lambda s_{xy}^2}}{2\lambda s_{xy}} \quad (8)$$

$$\widehat{\beta_0} = \bar{y} - \widehat{\beta_1}\bar{x} \quad (9)$$

Because in general $\widehat{\beta_1}$ has two solutions, the solution with the same sign as the covariance $s_{xy}$ can be selected. If the fluorescence channel intensities are positively correlated, the covariance, and therefore $\widehat{\beta_1}$ will also be positive. However, in some rare cases the covariance can be negative, such as when the fluorescence channel intensities are not correlated or the colocalised intensities are very sparse. The method selects positive solutions for $\widehat{\beta_1}$ which ensures a positive slope for the regression line thereby highlighting voxels for which both fluorescence intensities are high.

The method may include applying (206) a threshold filter to exclude voxels associated with signal intensity data corresponding to background noise or non-correlated signal intensity data. The threshold filter may be applied to each of the first and second fluorescence signal channels. Background noise may comprise signal intensity data below a threshold filter minimum for each channel ($T_{ch1}$, $T_{ch2}$). Non-correlated signal intensity data may comprise data from at least one of the first and second fluorescence channels which is below the threshold filter minimum ($T_{ch1}$, $T_{ch2}$) for that channel. Different threshold filters may be applied to the first fluorescence channel data and the second fluorescence channel data, alternatively the same threshold filter may be applied to both the first fluorescence channel data and the second fluorescence channel data. In some embodiments, the threshold filter may be manually determined, and in other alternate embodiments the threshold filter may be automatically determined. Taking into account threshold filtering, the means and covariances of Equations (5) to (9) can be calculated using only the colocalisation intensities $q_i$ above the threshold filters.

Figure 3:
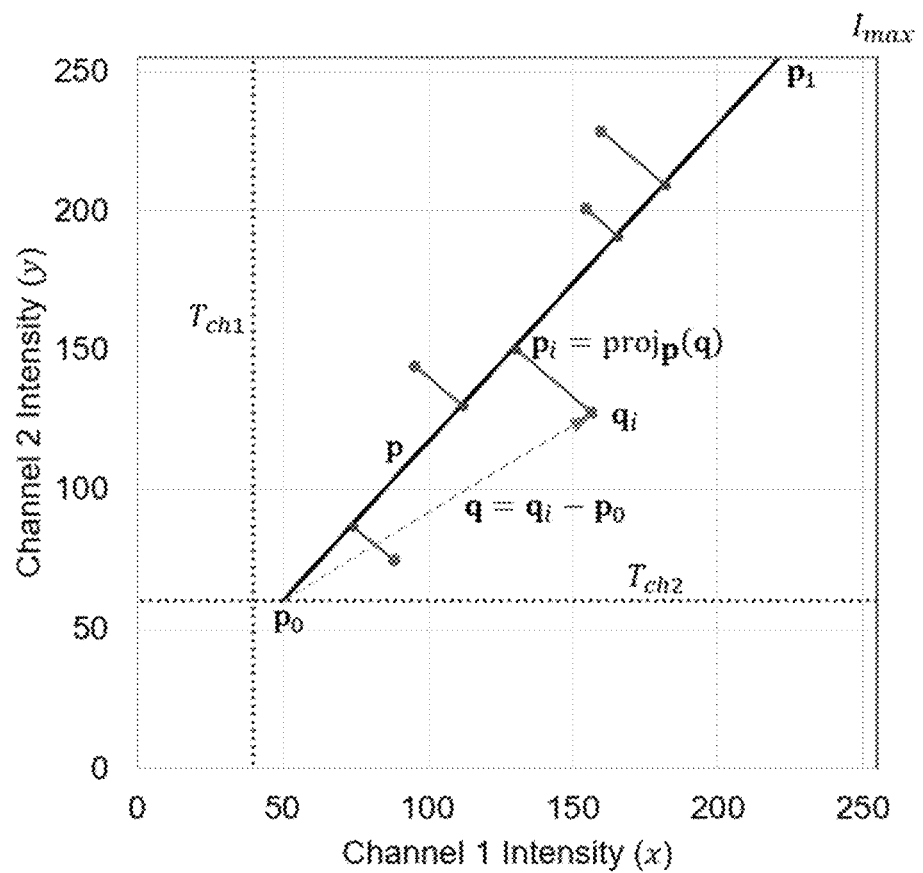
FIG. 3 is a graph illustrating mapping of signal intensity data onto a regression parameter. A colocalisation intensity $q_i$ is mapped onto a 1D subspace defined by vector p. A mapping onto point $p_0$ corresponds to a coloumap value of 0, a mapping onto point $p_1$ corresponds to a colourmap value of 1, and intermediate mappings correspond to a colourmap value varying linearly between these values.

The method may include mapping (208) or projecting the signal intensity data to the regression parameter. The regression parameter, which may be a regression line, may be equated to a 1D subspace onto which the colocalisation intensities $q_i$ can be mapped. FIG. 3 illustrates how the signal intensity data can be mapped to the regression parameter. In order to perform the mapping, the regression parameter can be represented as a vector p, that passes through two points $p_0$ and $p_1$ representing an upper limit and a lower limit of the regression parameter in the 1D subspace. The upper limit may correspond to a maximum signal intensity of at least one of the first and second fluorescence channels. In the embodiment shown in FIG. 3, the upper limit corresponds to a maximum signal intensity value of the first fluorescence channel (channel 1). Similarly, the lower limit may correspond to a minimum signal intensity of at least one of the first and second fluorescence channels and in the embodiment illustrated in FIG. 3 this corresponds to the lower limit of the first fluorescence channel (channel 1).

The intersection $p_0$ of the regression parameter can be calculated as follows:

$$p_0 = (x_{p_0}, y_{p_0}) = \begin{cases} (T_{ch1}, T_{ch1} \times \widehat{\beta_1} + \widehat{\beta_0}), & \text{if } T_{ch2} \leq T_{ch1} \times \widehat{\beta_1} * \widehat{\beta_0} \\ (\frac{T_{ch2}-\widehat{\beta_0}}{\widehat{\beta_1}}, T_{ch2}), & \text{if } T_{ch2} > T_{ch1} \times \widehat{\beta_1} + \widehat{\beta_0} \end{cases} \quad (10)$$

Similarly, $p_1$ denotes the intersection between the regression line and the maximum possible fluorescence intensity $I_{max}$, and may be calculated as follows:

$$p_1 = (x_{p_1}, y_{p_1}) = \begin{cases} (\frac{I_{max}-\widehat{\beta_0}}{\widehat{\beta_1}}, I_{max}), & \text{if } \widehat{\beta_0} \geq I_{max} \times (1 - \widehat{\beta_1}) \\ (I_{max}, I_{max} \times \widehat{\beta_1} + \widehat{\beta_0}), & \text{if } \widehat{\beta_0} < I_{max} \times (1 - \widehat{\beta_1}) \end{cases} \quad (11)$$

The colocalisation intensity of each voxel $q_i$ can be mapped (projected) perpendicularly onto the regression parameter p, resulting in a point $p_i$. To achieve this mapping the vector from $p_0$ to $q_i$ may be defined as q (FIG. 2) from which it follows that:

$$p_i = (x_{pi}, y_{pi}) = proj_p(q) = \frac{q \cdot p}{p \cdot p} p + p_0 \qquad (12)$$

The method may include assigning (210) colourmap values ($C_i$) to the voxels based on the mapped signal intensity data. As used herein, the term "colourmap" refers to a spectrum of colours in which each colour is associated with a numerical value. The colourmap values assigned to the voxels determine their colour when they are rendered into an image to display colocalisation of the data. Assigning (210) a colourmap value to each voxel based on the mapping includes assigning a colourmap value based on a level of combined channel signal intensities to emphasise greater signal intensities and limiting assigning colourmap values to voxels where both channel signal intensities are above defined respective channel intensity thresholds.

The assigned colourmap values ($C_i$) may be between an upper threshold value and a lower threshold value, depending on a linear position of $p_i$ along p. In some embodiments, the upper threshold value may be 1 and the lower threshold value may be 0 so that all of the mapped signal intensity data is assigned a colourmap value of between 0 and 1. However, the colourmap values may have any suitable range. The colourmap value may be used to assign a colour to the voxels by means of a colourmap. Some signal intensity data may exceed the upper limit of the regression parameter, for example where $p_1$ does not correspond exactly to the intensity ($I_{max}$; $I_{max}$). This signal intensity data may be thresholded to a colourmap value corresponding to the upper threshold value, which in some embodiments may be 1. Similarly, some signal intensity data may have a mapped value ($p_i$) that is less than the lower limit of the regression parameter (i.e. $p_0$ in FIG. 3), causing $p_i$ to lie below $p_0$. This may occur for example when $p_0$ does not correspond exactly to the intensity ($T_{ch1}$; $T_{ch2}$). This signal intensity data may be assigned a colourmap value corresponding to the lower threshold value, which in some embodiments may be 0. In this way, all of the mapped signal intensity values may be assigned a colourmap value within the colourmap value range. The colourmap values $C_i$ may be calculated according to the following Equation (in an embodiment in which the colourmap value range is from 0 to 1):

$$C_i = \begin{cases} 0, & \text{if } x_{p_i} \leq x_{p_0} \\ \dfrac{x_{p_i} - x_{p_0}}{x_{p_1} - x_{p_0}}, & \text{if } x_{p_0} < x_{p_i} < x_{p_1} \\ 1, & \text{if } x_{p_i} \geq x_{p_1} \end{cases} \qquad (13)$$

Figure 4:
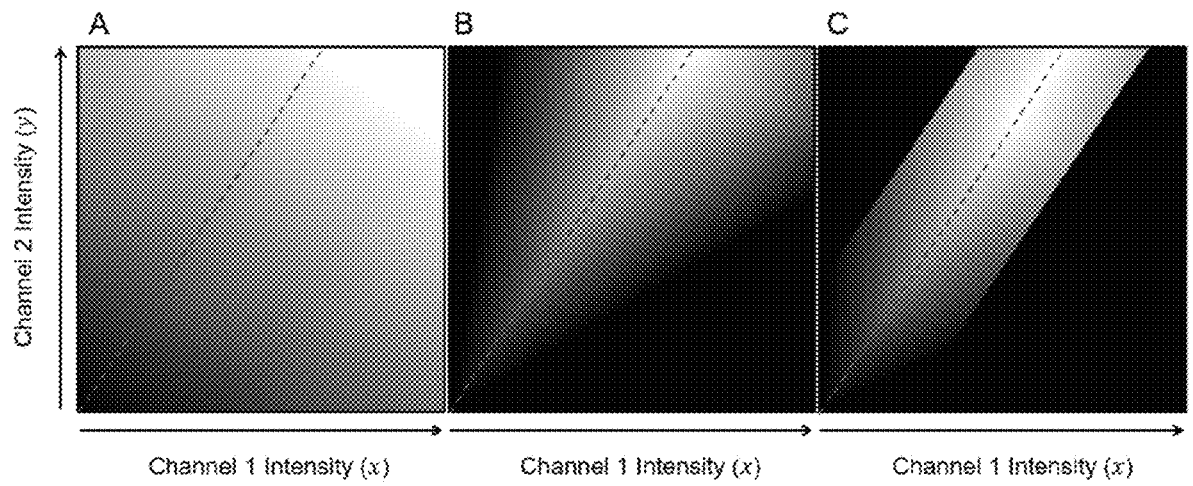
FIG. 4 is an illustration of the effect of the method of the present disclosure on possible colocalisation intensities. Using FIG. 3 as a reference, a regression line (shown as a dashed line) with $\hat{\beta}_1=1:5$ and $\hat{\beta}_0=0$ for illustration. The colourmap value ($C_i$) calculated for each possible colocalisation intensity $q_i=(x_i; y_i)$ using the Magma colourmap, where black corresponds to $C_i=0$ and bright yellow corresponds to $C_i=1$ is visualised. For clarity, both threshold filters $T_{ch1}$ and $T_{ch2}$ are zero in this example. A: The colourmap values $C_i$ using Equation 13. B: The colourmap values $C'_i$ using Equation 15 with $\theta=60°$ C: The final colourmap values $C_i$ using Equation 17 with $d_t=0.2$ and $x_{\mu max}=0.8 I_{max}$.

The effect of Equation 13 on the voxels in a sample may be visualised by plotting the colourmap intensity $C_i$ that would be used for every possible colocalisation intensity $q_i$ for a particular regression parameter. The result of this plotting is illustrated in FIG. 4A, which shows that voxels that have high fluorescence intensities for both x and y are assigned a high value of $C_i$, while lower fluorescence intensities are assigned lower values of $C_i$. Equation 13 therefore satisfies an objective of highlighting voxels with greater combined fluorescence intensities. However, it does not suppress voxels that are not positively correlated. Instead, it assigns the same colourmap value to all colocalisation intensities that lie on a line perpendicular to the regression parameter, without removing outliers.

The method may therefore include reducing (212) assigned colourmap values of voxels embodying poorly correlated signal intensity data or signal intensity data most significantly deviated from the regression parameter in proportion to their deviation from the regression parameter in order to suppress the visualisation of such voxels in the rendered image. In some embodiments, the assigned colourmap values of all mapped signal intensity data may be reduced in proportion to a degree of deviation from the regression parameter. In this way, voxels corresponding to poorly correlated signal intensity data may have their colourmap values suppressed (attenuated) to a greater extent than voxels corresponding to well correlated signal intensity data. This may result in enhanced visualisation of correlation between the first and second fluorescence channels in a rendered image of the voxels. In order to suppress poorly correlated voxels, a normalized perpendicular distance d between the signal intensity value $q_i$ and the regression parameter p may be calculated and the colourmap values adjusted according to the magnitude of d. This normalized distance d may be given as:

$$d = \frac{|q_i - p_i|}{I_{max}} = \frac{\sqrt{(x_i - x_{p_i})^2 + (y_i - y_{p_i})^2}}{I_{max}} \qquad (14)$$

Figure 5:
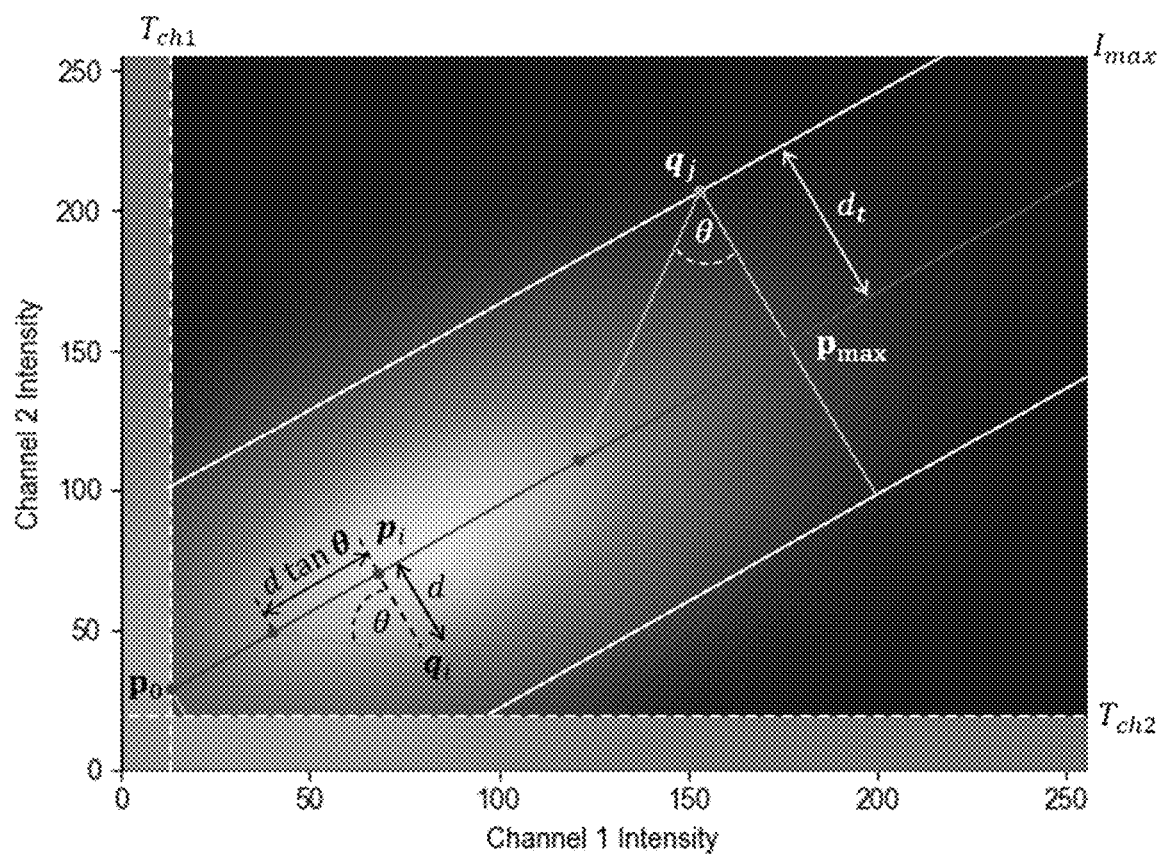
FIG. 5 is an illustration of an effect of applying colourmap thresholds using a synthetically generated scatter plot, where colourmap brightness indicates a frequency of voxels with a given colocalisation intensity. A regression line is shown in red, with two example intensity pairs, $q_i$ and $q_j$, shown in orange. A suppressing factor $\theta$ is applied when mapping both $q_i$ and $q_j$ onto the regression line. Only sample data above the channel thresholds, $T_{ch1}$ and $T_{ch2}$, are considered when determining the distance threshold $d_t$, shown in white. Any colocalisation intensities $q_i$ beyond a maximum point $p_{max}$ are assigned a colourmap value of 1. Similarly any $q_i$ below a minimum point $p_0$ are assigned a colourmap value of 0. These thresholds are indicated with two green lines at the respective points. Both $d_t$ and $p_{max}$ are determined independently to include 99% of the data, thereby excluding outliers from a visualisation of the voxels. A final colourmap value $C_i$ varies linearly between 0 to 1 from $p_0$ to $p_{max}$.

The normalization by $I_{max}$ ensures that $0 < d < 1$. The colourmap value $C_i$ calculated by Equation 13 may be suppressed linearly with the distance d. This may be achieved by projecting or mapping each colocalisation intensity $q_i$ onto the regression parameter at an angle θ to the perpendicular, as illustrated in FIG. 5. The value of a suppressing factor θ may therefore determine the extent to which the colourmap value $C_i$ is suppressed as d increases. Suppression may be achieved using the following Equation in which 0<θ<90:

$$C'_i = \begin{cases} C_i - d \times \tan(\theta), & \text{if } C_i > d \times \tan(\theta) \\ 0, & \text{if } C_i \leq d \times \tan(\theta) \end{cases} \qquad (15)$$

A suppressing factor of 0° corresponds to no attenuation of the colourmap value, and hence $C'_i = C_i$, while factors close to but excluding 90° correspond to maximum attenuation, effectively making $C_i = 0$, and completely suppressing all voxels for which $q_i$ does not coincide with the regression parameter. The effect of Equation 15 on all possible colocalisation intensities $q_i$ may be visualised in FIG. 4B for θ=60°. The suppressing factor θ may be selectable, alternatively, it may be automatically determined. In some preferred embodiments, θ=45°.

The method may include excluding (214) outliers in the data from being visualised in the rendered image. The outliers may be signal intensity data that is greater than a predetermined distance threshold from the regression parameter. In some embodiments, the predetermined distance threshold may correspond to between 50% and 100% of the signal intensity data, such as 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% of the signal intensity data above the threshold filters. Only voxels corresponding to signal intensity data for which a distance d between the colocalisation intensity $q_i$ and the regression parameter is below the predetermined distance threshold may be visualised, as illustrated in FIG. 5. The distance threshold dr may be determined automatically or manually to include a predetermined quantity of voxels with intensities above the channel threshold filters $T_{ch1}$ and $T_{ch2}$. In some preferred embodiments, the predetermined quantity of voxels may be 99% of all voxels with intensities above the channel threshold filters, which may correspond to approximately three standard deviations from a mean of the intensities, assuming a normal distribution of the intensities. An effect of applying a distance threshold $d_t$=0.2 is illustrated in FIG. 4C. The corresponding colourmap value may be calculated using Equation 16:

$$C_i'' = \begin{cases} C_i', & \text{if } d \leq d_t \\ 0, & \text{if } d > d_t \end{cases} \quad (16)$$

Where most voxels have low intensities for both channels, there may be an ineffective utilization of the colourmap spectrum and an associated limited variation in the visualisation. To address this, a point $p_{max}=(x_{\mu max}; y_{\mu max})$ may be defined on the regression parameter to indicate the maximum represented intensities for the image. Any mapped point $p_i$ beyond $p_{max}$ may be assigned a colourmap value corresponding to the upper threshold value, which in some embodiments may be 1. The point $p_{max}$ may be calculated to include a predefined percentage of all sample data above the channel threshold filters. The predetermined percentage may be selected from between 50% and 100%, such as 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% of all sample data above the channel threshold filters. Since all colocalisation intensities may be projected perpendicularly onto the regression parameter, the imposition of $p_{max}$ may have the effect of saturating the colourmap for voxels whose mapped intensities fall beyond $p_{max}$, indicated in green in FIG. 5. This may make more of the colourmap available for representing lower colocalisation intensities, thereby enabling clearer data interpretation. This re-scaling of the applied colourmap may be achieved by replacing $p_1$ with $p_{max}$ in Equation 13.

Given $q_i$ and $\theta$ and obtaining the parameters $p_0$, $p_i$ and $d$ from Equations 10, 12 and 14, Equation 13 can be re-written in its final form as follows:

$$C_i = \begin{cases} 0, & \text{if } x_{p_i} \leq d(x_{p_{max}} - x_{p_0})\tan(\theta) + x_{p_0} \text{ or } d > d_t \\ \dfrac{x_{p_i} - x_{p_0}}{x_{p_{max}} - x_{p_0}} - d \times \tan(\theta), & \text{if } d(x_{p_{max}} - x_{p_0})\tan(\theta) + x_{p_0} < x_{p_i} < x_{p_{max}} \\ 1 - d \times \tan(\theta), & \text{if } x_{p_i} \geq x_{p_{max}} \end{cases} \quad (17)$$

The result of Equation 17 may be a colourmap value $C_i$ between the upper threshold value and the lower threshold value (which in this case is 1 and 0, respectively) for any pair of measured fluorescence intensities $q_i=(x_i; y_i)$. It is envisaged, however, that the colourmap value $C_i$ may have a different range of values in other embodiments. The method of mapping fluorescence intensities in these other embodiments may be achieved in a similar manner to that achieved using Equation 17.

The method may include rendering (216) an image comprising the voxels. The voxels may be coloured according to their colourmap values so that colocalisation of the image data can be visualised. Correlation between data from the first and second fluorescence channels may also be visualised in the rendered image.

The colourmap values, for example, in the range from 0 to 1, may correspond to any suitable colour spectrum in which the colours are capable of being visually distinguished from each other.

In some embodiments, a colourmap with seven sections that are easy to discriminate visually may be used, although any other suitable number of colours may equally be used. The application of a standard colourmap to the intensity values in FIGS. 4A-C may result in the visualisation shown in FIGS. 6A-C.

Figure 6:
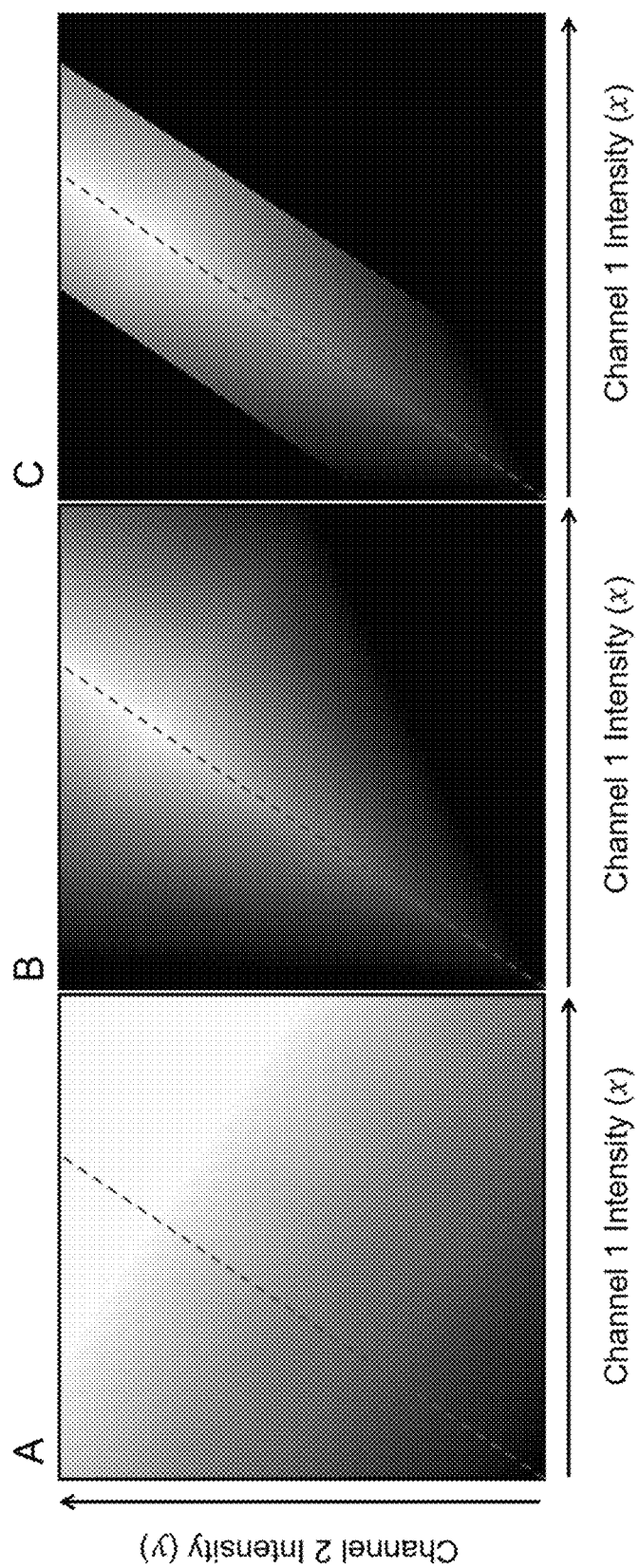
FIG. 6 A-C: Illustrate the results of applying a standard colourmap to the data represented in FIGS. 4A-C; D: Illustrates a visual representation showing a derivation of an alternative colourmap that may be used in the method and system of the present disclosure; and E-G: Illustrate the results of applying the colourmap of FIG. 6D to the data represented in FIGS. 4A-C.
Figure 6:
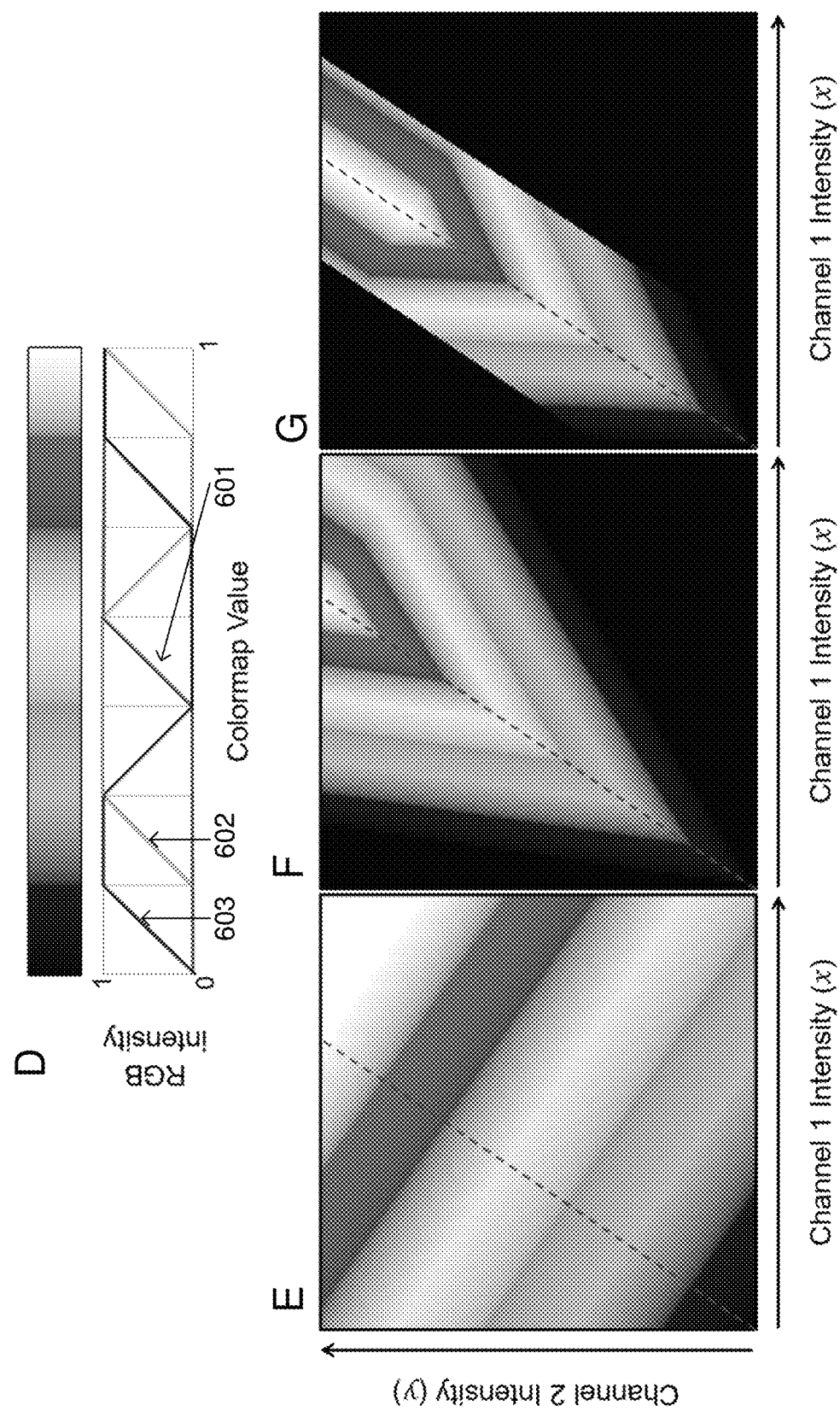

Another example colourmap is shown in FIG. 6D that may be generated using selected colours in sections, such as dark blue, light blue, green, yellow, orange, red and pink colours. and by either increasing or decreasing the red (601), green (602) or blue (603) intensity values linearly within each of the sections. The resulting rainbow-like colourmap may make it easy to identify regions of similar fluorescence intensity. The application of the colourmap of FIG. 6D to the intensity values in FIGS. 4A-C may result in the visualisation shown in FIGS. 6E-G.

Figure 7:
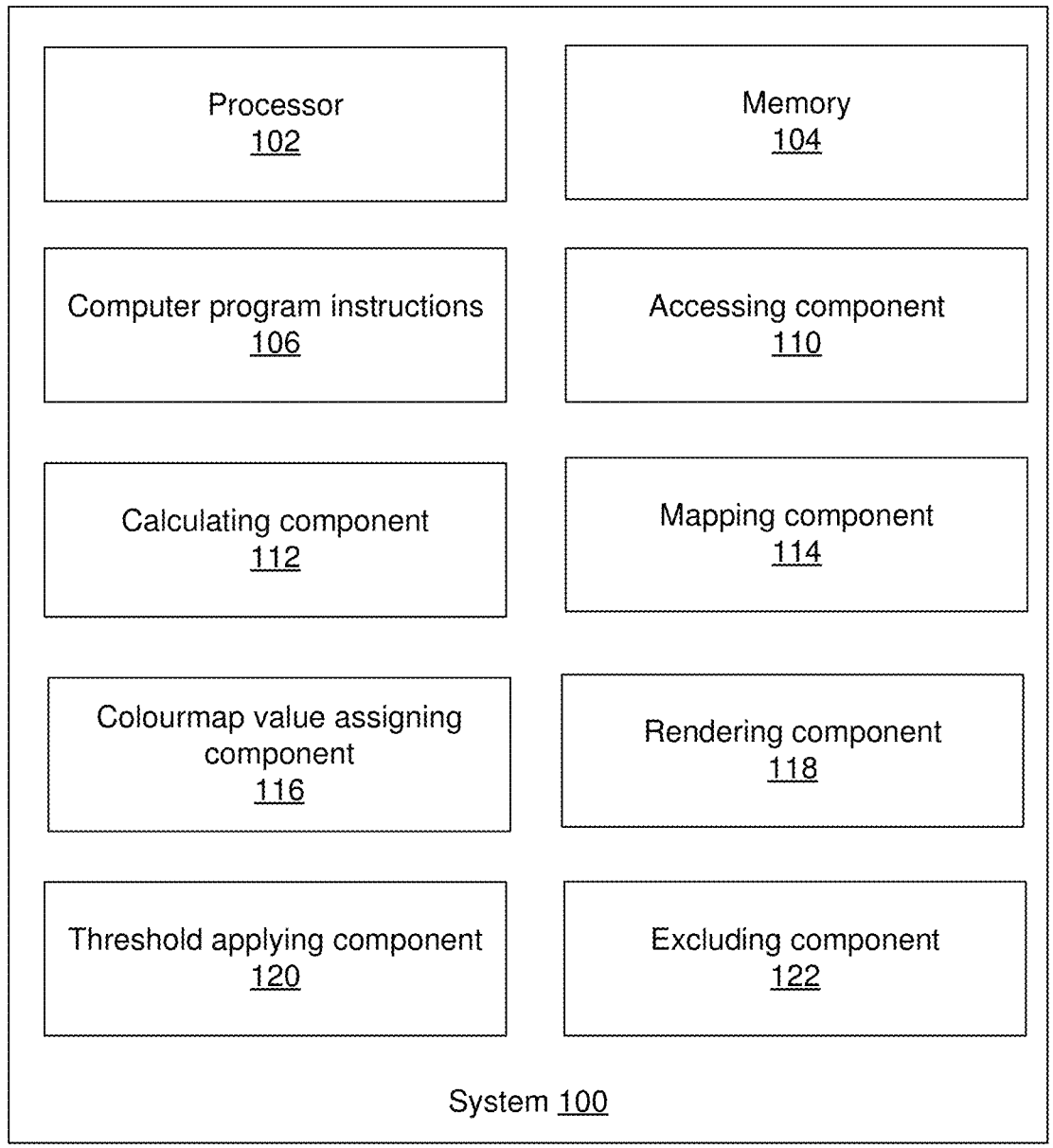
FIG. 7 is a block diagram which illustrates exemplary components of a system according to the present disclosure for visualising colocalisation in fluorescence image data.

Various components may be provided for implementing the method described above with reference to FIG. 2. FIG. 7 is a block diagram which illustrates exemplary components which may be provided by a system for visualising colocalisation in fluorescence image data.

The system (100) may include an accessing component (110) for accessing signal intensity data, a calculating component (112) for calculating a regression factor on the signal intensity data to generate a regression parameter, a mapping component (114) for mapping the signal intensity data to the regression parameter and a colourmap value assigning component (116) for assigning colourmap values to the voxels associated with the mapped signal intensity data. The system (100) may further include a rendering component (118) for rendering an image comprising the voxels, a threshold applying component (120) for applying a threshold filter to the data to exclude voxels associated with background noise or non-correlated signal intensity data, and an excluding component (122) for excluding outliers in the data from being visualised in the rendered image.

Figure 8:
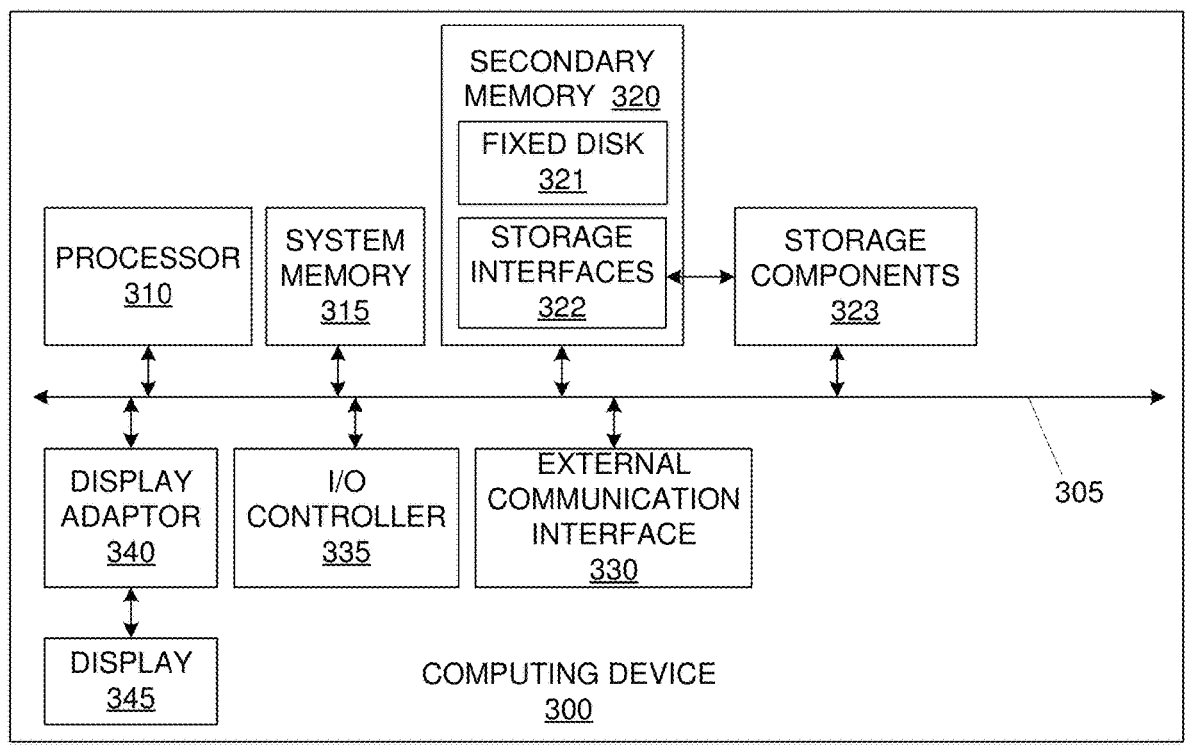
FIG. 8 illustrates an example of a computing device in which various aspects of the disclosure may be implemented.

FIG. 8 illustrates an example of a computing device (300) in which various aspects of the disclosure may be implemented. The computing device (300) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (300) may be suitable for storing and executing computer program code. The various participants and elements in the previously described system diagrams may use any suitable number of subsystems or components of the computing device (300) to facilitate the functions described herein. The computing device (300) may include subsystems or components interconnected via a communication infrastructure (305) (for example, a communications bus, a network, etc.). The computing device (300) may include one or more processors (310) and at least one memory component in the form of computer-readable media. The one or more processors (310) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (300) may be distributed over a number of physical locations (e.g. in a distributed, cluster or cloud-based computing configuration) and appropriate software units may be arranged to manage and/or process data on behalf of remote devices.

The memory components may include system memory (315), which may include read only memory (ROM) and random access memory (RAM). A basic input/output system (BIOS) may be stored in ROM. System software may be stored in the system memory (315) including operating system software. The memory components may also include secondary memory (320). The secondary memory (320) may include a fixed disk (321), such as a hard disk drive, and, optionally, one or more storage interfaces (322) for interfacing with storage components (323), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (300) may include an external communications interface (330) for operation of the computing device (300) in a networked environment enabling transfer of data between multiple computing devices (300) and/or the Internet. Data transferred via the external communications interface (330) may be in the form of signals, which may be electronic, electromagnetic, optical, radio, or other types of signal. The external communications interface (330) may enable communication of data between the computing device (300) and other computing devices including servers and external storage facilities. Web services may be accessible by and/or from the computing device (300) via the communications interface (330). The external communications interface (330) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (310). A computer program product may be provided by a non-transient computer-readable medium, or may be provided via a signal or other transient means via the communications interface (330).

Interconnection via the communication infrastructure (305) allows the one or more processors (310) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (300) either directly or via an I/O controller (335). One or more displays (345) (which may be touch-sensitive displays) may be coupled to or integrally formed with the computing device (300) via a display (345) or video adapter (340).

The described method and system address the technical problem of considering the correlation of fluorescence signals from two fluorescence channels within and between structures in fluorescence microscopy of a sample in order to accurately quantify a degree of colocalisation in the sample as well as to assess the location and intensity. Conventionally, colocalisation is performed in a two-dimensional space and extension is provided to three-dimensional input data.

The provided solutions provide a visualization of colocalisation with regression adjustment based on relationships between intensities of two fluorescence channels. The described method and system may take into account underlying channel intensities and their signal distribution. Using three-dimensional raw data where the colocalisation signal may differ along the z-axis, a three-dimensional special visualization of colocalisation is provided. The benefits of the described method and system include reducing variability, uncertainty and ambiguity that may derive from researcher-dependent thresholding. This results in decreased bias and increased robustness in data analysis and display. The method and system may be applied in image analysis software packages as a colocalisation plug-in application, as required in fields of biomedical and natural science disciplines or molecular pathologists, where diagnosis or cell analysis includes profiles of colocalisation These may also be used in high throughput image analysis workflows associated with fields such as diagnostics, drug development, etc.

EXAMPLES

In the following examples, the method and system is applied and validated by visualising colocalisation in both synthetically generated data as well as in three distinct biological samples.

This demonstrates the advantages offered by the method and system of the present disclosure. In the first biological sample the colocalisation between α/β tubulin and acetylated tubulin is visualised. In the second and third samples the colocalisation between two organelles and between an organelle and tubulin are respectively visualised. In the third example, the fused state between lysosomes and autophagosomes and between autophagosomes and tubulin are investigated. Due to the small size of the organelles and the fineness of the filamentous tubulin structures, it is commonly challenging to accurately investigate the degree of colocalisation between them. These structures were therefore deliberately chosen to demonstrate the performance of the present method and system in challenging scenarios. The synthetic data was designed to mimic and better demonstrate aspects of these biological samples.

Throughout the example, the method of the present disclosure are compared to the nM DP method of the prior art, since nMDP is currently the most widely used method of spatially visualising the correlation of colocalised voxels using a colourmap. For both the present method and nMDP, all parameters were calculated over the entire 3D z-stack. For purposes of comparison, manual intensity thresholding was used to remove background intensities for both methods. These thresholds are shown in the scatter plots accompanying the figures. Part of the design of the present method is the automatic adjustment of the maximum colourmap value to ensure optimal use of the available spectrum. For nMDP, however, it is standard practice to fix the minimum and maximum values to −1.0 and 1.0, respectively. However, this does not always generalize optimally, especially since nMDP can produce values beyond these limits. Therefore, to ensure the best visualisation for each image set, the minimum and maximum values of the nMDP colourmap were manually adjusted. These values are indicated on the nMDP colourbars in the figures. Similarly, the suppressing factor $\theta$ that was used for each sample is shown on the colourbar.

Figure 9:
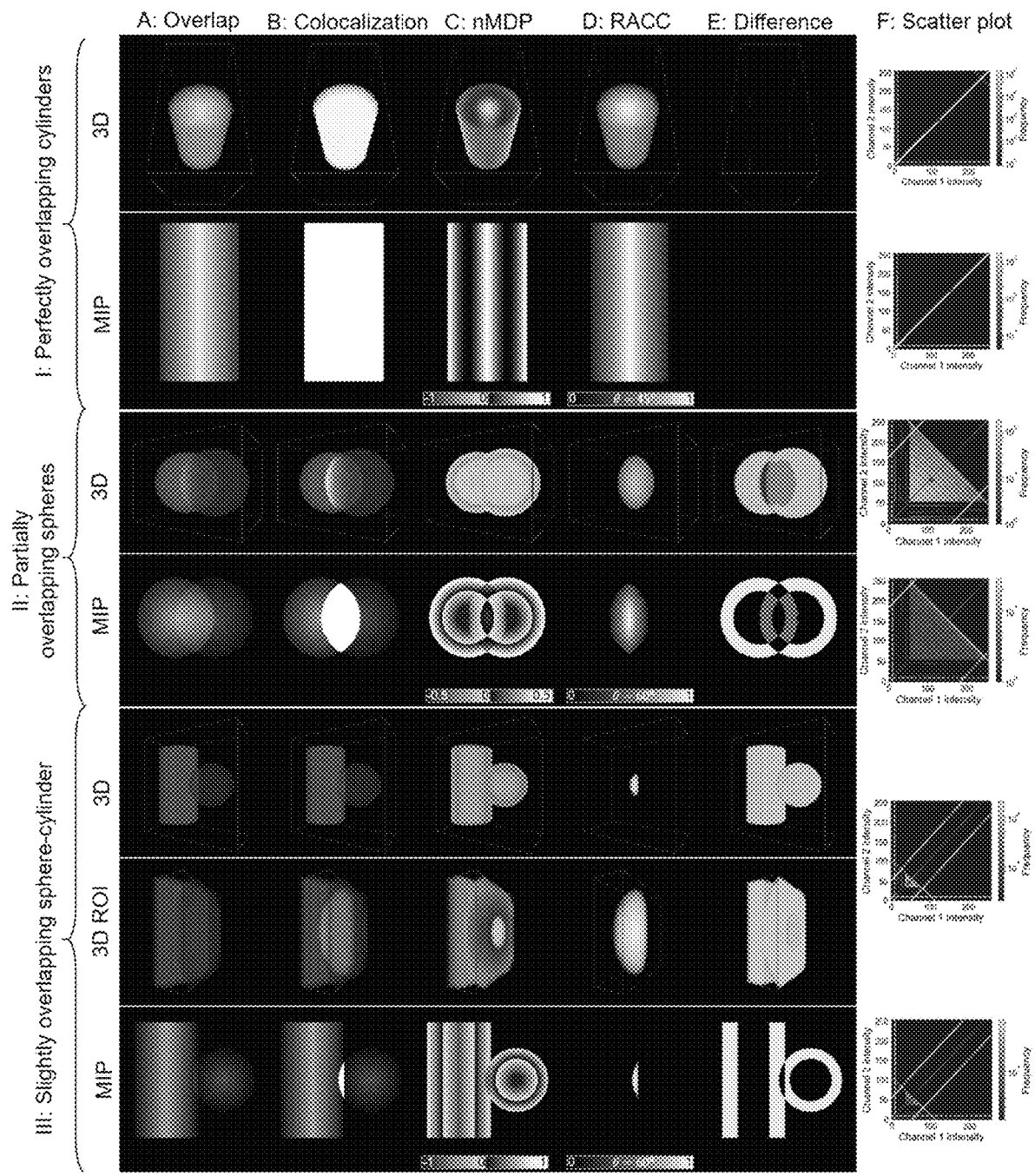
FIG. 9 is a visualisation of synthetic data using both 3D images and maximum intensity projections (MIP). A: The overlapping fluorescence channel intensities. B: All voxels above the colocalisation thresholds and therefore considered colocalised are overlaid in white. C: The result of applying the nMDP. D: The result of applying the method of the present disclosure (labelled "RACC"). E: The difference between the method of the present disclosure and the nMDP method. Magenta represents areas which nMDP considers not-colocalised but that the method of the present disclosure considers colocalised, while yellow represents areas that nMDP considers colocalised but the method of the present disclosure does not. F: Scatter plots for the 3D and MIP datasets, showing the frequency each fluorescence with which intensity combination occurs. The regression line calculated by the method of the present disclosure is shown in red. The maximum and distance thresholds for the present method are shown in orange and white, respectively. The red marker represents the per-channel average intensities used by the nMDP calculations and around which the four quadrants are separated.

Three sets of synthetic data, shown in section I, II and III of FIG. 9. Section I shows two perfectly overlapping cylinders of the same size. These model the overlap between $\alpha/\beta$ tubulin and acetylated tubulin that will be seen in the biological samples. Section II shows two partially overlapping spheres, and are an idealisation of autophagasome-lysosome fusion. Finally, Section III shows a slightly overlapping cylinder and a sphere, representing autophagasome-tubulin interaction. This scenario is similar to the start of autophagasome-lysosome fusion which was modelled using two slightly overlapping spherical structures. For all synthetic images, the highest colour intensity occurs at the center of the spheres and cylinders and decreases towards the surface of these structures. This mirrors the observed fluorescence intensities in the biological samples. Furthermore, in the case of the synthetic data, it is often insightful to consider the maximum intensity projection (MIP), which provides an internal perspective of the 3D datasets. This is useful because most of the variation in fluorescence intensity occurs inside the volume and not at the surface.

FIG. 9A shows the colocalisation between red and green channels as yellow, and FIG. 9B shows the same colocalised voxels in white. These are the most common ways of visualising colocalisation. Therefore, a colocalisation colourmap should only assign a colourmap value to the voxels in white. This value must vary with the channel intensities of the colocalised voxels in a manner similar to that seen in FIG. 9A. When considering FIG. 9C, recall that nMDP visualises colocalised voxels in shades of red to yellow, while voxels that are not-colocalised are visualised in shades of blue. By considering sections II and III of FIG. 9C, it is clear that, the nMDP assigns a colourmap value to all voxels for which either fluorescence channel is present, and not only to those that would normally be considered colocalised (indicated as white in FIG. 9B). Since it is common for the channel means (indicated by a red dot in FIG. 9F) to be greater than the intersection point of the two channel thresholds, lower intensity voxels are not removed from the visualisation. FIG. 9D shows that the method of the present disclosure only assigns colours to voxels that are considered colocalised and does not visualise voxels that are not colocalised. This occurs because the present method is only calculated for voxels for which both fluorescence intensities are above the channel thresholds, whereas for nMDP it is sufficient when a single fluorescence channel is above the respective channel threshold. FIG. 9E visualises this difference by showing regions that are labelled as colocalised by nMDP but not by the present method in yellow, and regions for which the converse is true in magenta.

In the case of the perfectly overlapping cylinders (FIG. 9I), both fluorescence channels are perfectly correlated. Initially the nM DP decreases from a high intensity at the center of the cylinder to its periphery. However, at lower fluorescence intensities an increase is again observed, leading to an unintuitive interpretation of the correlation in the colocalisation. This increase is due to the nMDP calculation only considering the deviation from the mean and not the magnitude of the intensity. The present method shows a linear decrease from the high fluorescence intensities at the center of the cylinder to the lower intensities at its periphery, thereby highlighting volumes with higher fluorescence, which typically correspond to a higher concentration of the fluorescence label. Note that since the x and y of all colocalisation intensities are the same and form a line on the scatter plot in FIG. 9F, the suppressing factor $\theta$ has no effect on the visualisation.

When considering the partially overlapping spheres (FIG. 9II), the fluorescence intensities at the center of the overlapping volume are strongly correlated, with correlation decreasing towards the edges of the overlapping region. This can be easily discerned from the visualisation corresponding to the method of the present disclosure in column F. It can also be noticed that the left and right sides of the visualisation of the present method are slightly clipped due to the distance threshold (Equation 16) which removes outliers. Furthermore, since the maximum point is calculated to include 99% of the voxels (indicated by the orange line in FIG. 9F), the entire colourmap spectrum is used for the visualisation. On the other hand, the nMDP visualisation is more ambiguous, since the region near the surface of the spheres appears to contain the majority of the colocalised voxels, while in fact there is no colocalisation in that region as indicated by column B. Furthermore, the nMDP does not correctly show the entire overlapping volume as colocalised, with the overlapping volume further from the center being shown as not-colocalised.

When considering the slightly overlapping sphere and cylinder (FIG. 9III), there is only a small region in which colocalisation occurs. Since the intensities of the two channels are similar in the colocalised region, they should be fairly well correlated. This aspect is intuitively reflected when using the present method, where regions of similar fluorescence intensity in the center of the overlapping region are highlighted. As in the case of the partially overlapping spheres, regions of lower channel intensity near the surface are again erroneously labelled as colocalised by the nMDP. Moreover, the nMDP does not visualise the overlapping volume noticeably different from the surrounding structure. This leads to a visualisation that could be difficult to interpret.

The nMDP has been and continues to be used in many studies in the life sciences, where the precise spatial analysis of colocalisation is of particular relevance. These include the assessment of molecular interactions at the neuromuscular junction, the analysis of vesicular structures part of the endosomal compartment, the characterization of filamentous actin or tubulin network structures and the localization and assessment of the degree of protein interaction at the subcellular level. In most of these studies, the quantification of colocalisation based on a colourmap is limited and conclusions are based primarily on the comparison of colocalisation metrics such as the PCC. The present method may offer new perspectives, by restricting the analysis to the colocalised voxels and by allowing a more robust identification of the intensity correlation at colocalised voxels. In the following both nMDP and the present method are applied to a subset of biological samples with similar complexity and the results compared.

Cell culture and Transfections

Mouse embryonic fibroblasts (MEFs) as well as stably expressing GFP-LC3 MEF's were supplemented with Dulbecco's Modified Eagles Medium (DMEM), 1% penicillin/streptomycin (PenStrep) (Life Technologies, 41965062 and 15140122) and 10% foetal bovine serum (FBS) (Scientific Group, BC/50615-HI) and incubated using a humidified incubator (SL SHEL LAB $CO_2$ Humidified Incubator) in the presence of 5% $CO_2$ at 37° C. Where applicable, cells were micropatterned, as previously shown, to better highlight structures in highly defined geometric constraints. Cells were seeded in either an 8-chamber cover slip-based dish (Nunc, Lab-Tek, 155411) or a micropatterned slide for experimental purposes.

Immunofluorescence and Super Resolution Structured Illumination Microscopy (SR-SIM)

MEF cells were fixed using a 1:1 ratio of 4% formaldehyde (Sigma-Aldrich, USA) and DMEM, for 10 minutes at 37° C. and washed with phosphate buffered saline (PBS). Cells were permeabilized using 0.2% Triton-x for 10 minutes and blocked in 1% bovine serum albumin (BSA) for 30 minutes room temperature. Thereafter, cells were incubated at 4° C. overnight in primary antibodies against a/l3 tubulin (Cell Signaling, #2148), acetylated tubulin (SC-23950, Santa Cruz) and LysoTracker red (Life Technologies, #L-7528), followed by a washing step and incubation for 90 minutes with secondary antibodies Alexa-488 and Alexa-561. SR-SIM and confocal micrographs were acquired using the ELYRA PS.1 station (Carl Zeiss Microimaging; Germany). Thin (0.1 μm) Z-stacks of high-resolution image frames were collected in 3 rotations using the microscope equipped with an Andor EM-CCD camera (iXon DU 885). Images were reconstructed using ZEN software (black edition, 2011, version 7.04.287) based on a structured illumination algorithm.

Analysis of α/β Tubulin and Acetylated Tubulin Overlap

Figure 10:
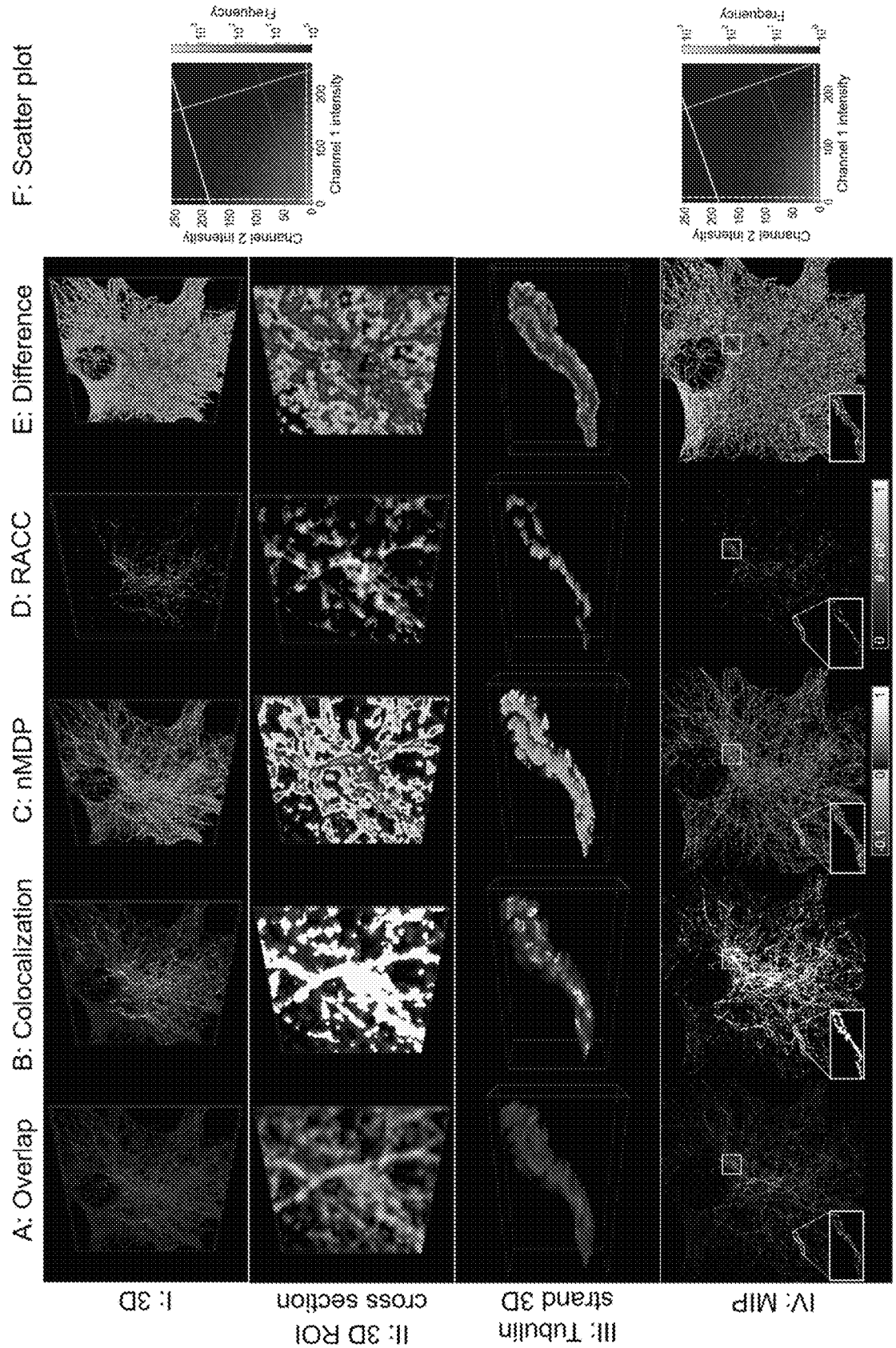
FIG. 10 is a series of images illustrating α/β tubulin (red) and acetylated tubulin (green) visualisation. The structure of the figure is similar to that of FIG. 9, but in this case biological samples and not synthetic data are considered.

The tubulin network in a cell is characterized by dynamic modifications such as acetylation, which impacts its properties such as stiffness and function. Here, the degree of acetylation relative to the entire tubulin network was assessed through colocalisation analysis. Since microtubulues are delicate filamentous structures, their overlap is very challenging to analyse. In order to analyse colocalisation, specific ROI selections at the cell's periphery (row II in FIG. 10) were made as well as a cross section along the z-axis in the perinuclear region (row III in FIG. 10). This cross section was introduced so that the colocalisation inside the tubulin can also be visualised, where the correlation between the fluorescence channels is the strongest. In this way, colocalisation could be analysed with precision in regions with both high and low fluorescence channel intensity. Where these selections are located is shown on the MIP in row IV of FIG. 10. In row II of the the nMDP visualisation in FIG. 10C, the central area is clearly highlighted as being colocalised. However, since a colourmap value is assigned to all voxels for which a fluorescence channel is present, it is not possible to clearly discern the extent of this colocalisation. The method of the present disclosure similarly highlights the central region as colocalised (row II in FIG. 10D). However, it also indicates that there is a greater extent of colocalisation in this region. Regions of lower intensity and with a weaker correlation between fluorescence channels are retained when using the present method and are shown as colocalised in darker hues of blue, whereas nMDP reports these regions as not colocalised. Furthermore, nMDP falsely demarcates several regions around edges of the sample as being colocalised, indicated by yellow in FIG. 10E, which leads to a visualisation that detracts from the truly colocalised regions. A prominent tubulin strand was isolated from the sample in row III of FIG. 10D. Here the nMDP indicates no colocalisation, while the present method is able to indicate this volume as colocalised and allows one to discern the varying degree of correlation.

Analysis of Autophagasome and Lysosome Fusion

Figure 11:
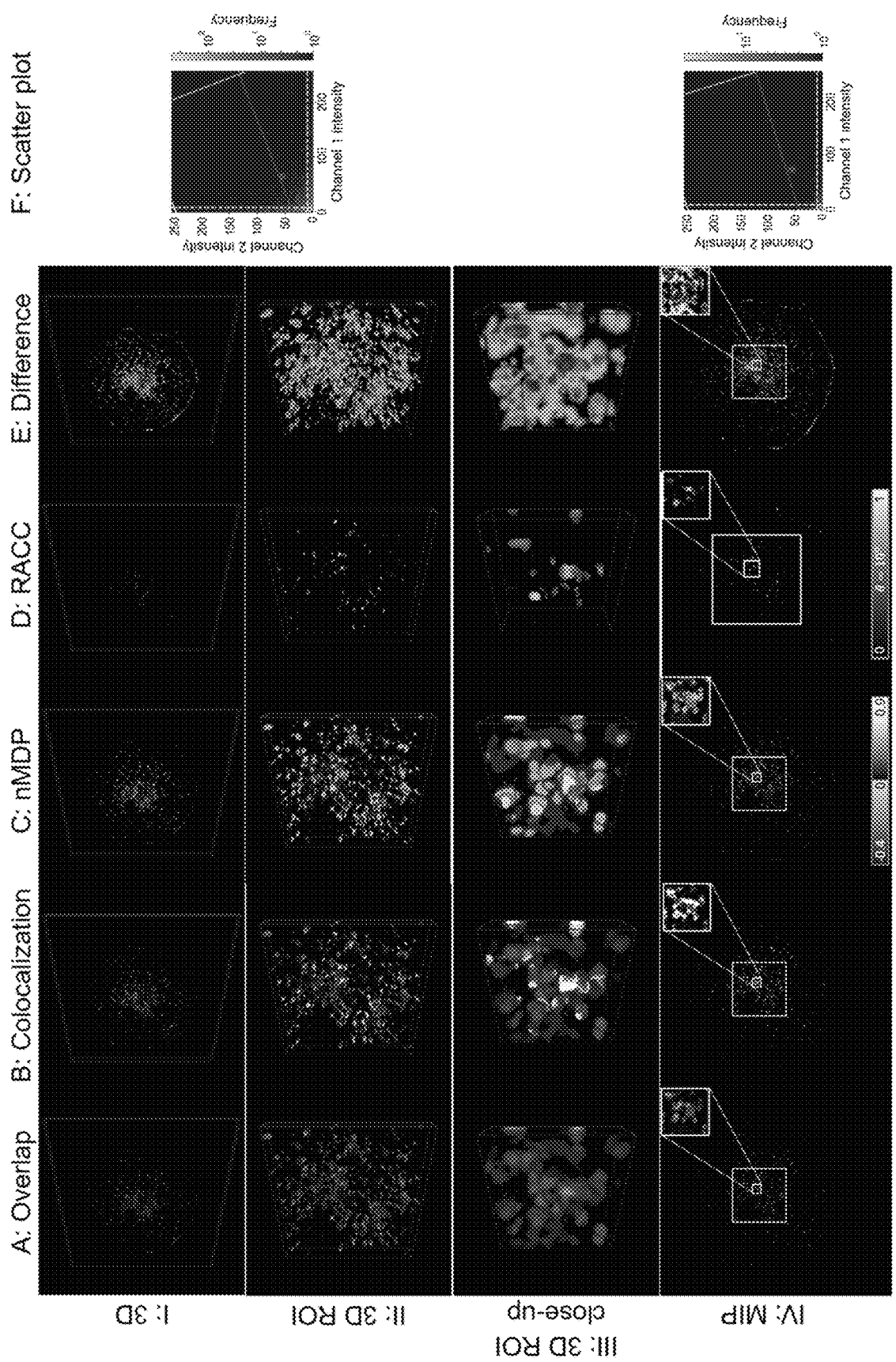
FIG. 11 is a series of images illustrating autophagasome (green) and lysosome (red) fusion visualisation. The structure of the figure is similar to that of FIG. 9, but in this case biological samples and not synthetic data are considered.

Protein degradation though macroautophagy plays a critical role in cellular homeostasis, metabolism and disease. It is characterized by the delivery of autophagosomes to lysosomes, where, upon fusion, an autolysosome is formed, and hydrolytic degradation takes place. To better understand autophagy function and dysfunction, it is of major interest to discern the contribution of the pathway intermediates to the total intracellular vesicle pool size, i.e. autophagosomes, autolysosomes and lysosomes. Visualising the fusion zone between autophagosomes and lysosomes is hence of critical importance, and will be used here as a second example to compare the present method and nMDP (FIG. 11). Due to the small size of these organelles, it is challenging to visualise the degree of fusion that has taken place. Note that this fusion is what has been modelled in the synthetic data by means of partially overlapping spheres. As previously presented in the synthetic data, the nMDP erroneously indicated regions near the surface of the spheres as colocalised. A similar observation can be made in the case of the autophagosome/lysosome fusion in FIG. 11C. This may detract from the true interaction between the organelles and hence from the correct interpretation of the colocalisation data. This is also reflected in the substantial difference between nMDP and the present method shown in FIG. 11E.

The present method shows only the colocalised voxels, which allows the colocalised regions with a strong correlation of the fluorescence channels (high intensities of the colourmap of the present method) as well as regions with lower correlation (darker blue regions) to be clearly discerned. This is best seen in rows II and III of FIG. 11D. By isolating a small region of the cell, shown in row III, the present method reveals which of these colocalisations indicates an almost complete fusion between the organelles and hence the extent of autophagy progression.

Analysis of Autophagasome and Tubulin Interaction

Figure 12:
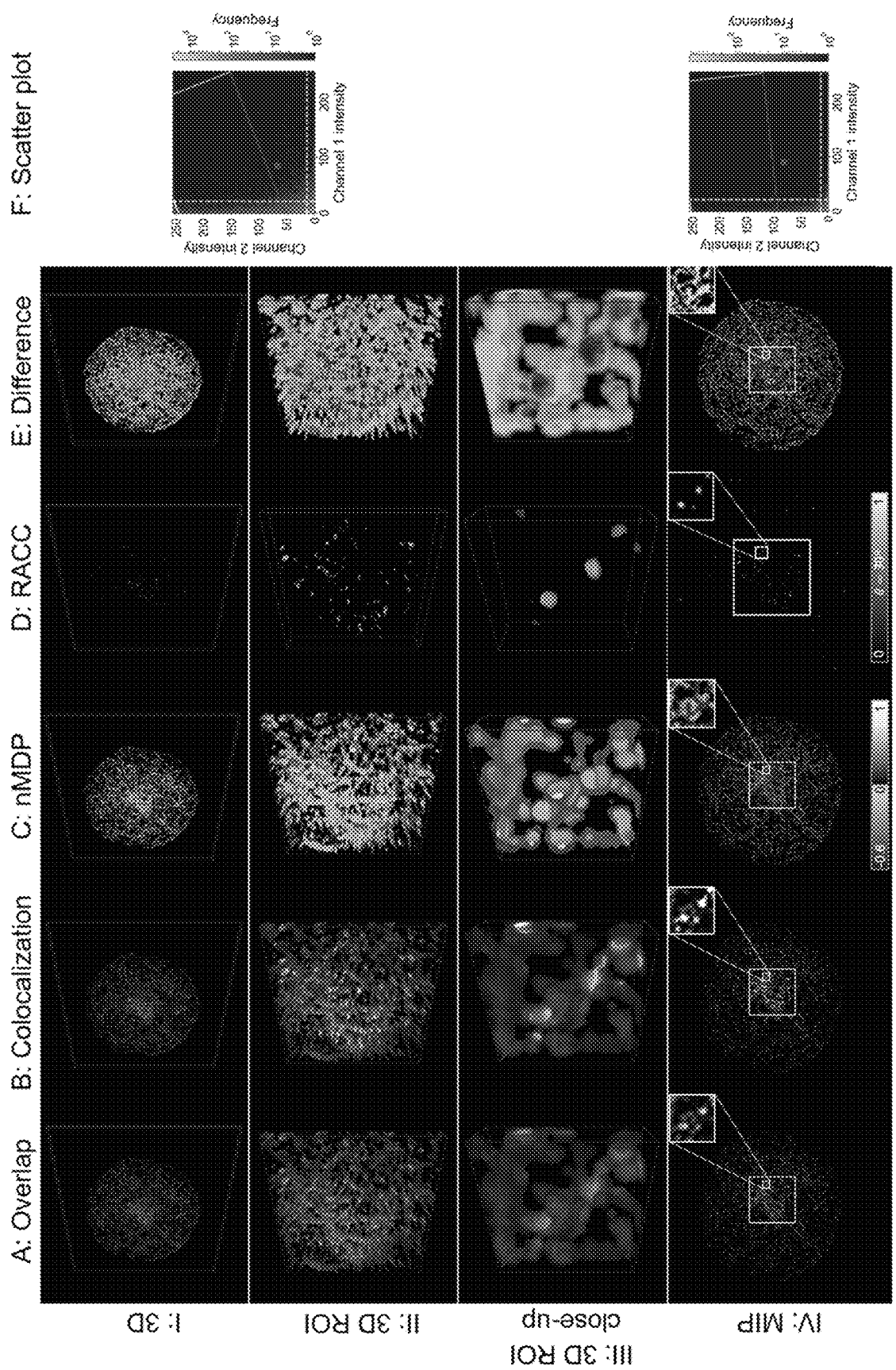
FIG. 12 is a series of images illustrating autophagasome and tubulin visualisation. The structure of the figure is similar to that of FIG. 9, but in this case biological samples and not synthetic data are considered.

Autophagosomal transport is facilitated by the microtubule network. Hence, the interaction between these two structures and its accurate visualisation is of major interest. Such autophagasome and tubulin interaction is shown in FIG. 12. Since the autophagasomes are transported along the tubulin network, there is very little overlap between them and consequently very few colocalised voxels. Therefore two ROIs were assessed in order to investigate the interaction in more detail. These ROIs are shown in rows II and III of FIG. 12 and their location within the sample as a whole is shown on the MIP in row IV.

As for autophagasomes and lysosomes (FIG. 11O), the nMDP in FIG. 12C does not clearly indicate the correlation of the colocalisation between the fluorescence channels. This is mainly due to the incorrect identification of voxels at the edge of the structures as colocalised. A similar result was also observed for the synthetic data consisting of partially overlapping spheres. The magenta areas in row III of FIG. 12E, which appear red due to the yellow surrounding voxels, also match the structures that the present method identifies as colocalised in FIG. 12D. This indicates that nMDP is not suitable to precisely and correctly visualise the truly colocalised regions, shown in white in FIG. 12B. Since the present method shows only colocalised voxels, by considering it in conjunction with the overlapping fluorescence channels (FIG. 11A and B), a better understanding of the interaction between the autophagasome and tubulin can be obtained. The qualitative extent of these colocalisation events can also be determined more intuitively.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perin™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers. The invention will now be described in more detail by way of the following non-limiting examples.

The invention claimed is:

1. A computer-implemented method for visualising colocalised fluorescence signals in fluorescence microscopy of a sample comprising:
   accessing multi-dimensional signal intensity data in the form of fluorescence data in a three-dimensional image space including signal intensity data for a first fluorescence channel and a second fluorescence channel associated with each voxel of a three-dimensional image;
   calculating a regression as an errors-in-variables regression on the fluorescence data to generate a regression parameter corresponding to a degree of correlation between the signal intensity data obtained from the first and second fluorescence channels, with values of the regression parameter represented by a best fit line of points on a graph with axes representing the signal intensity values of the first and second fluorescence channels and with colourmap values varying along the regression parameter line;
   mapping, for each voxel, the multi-dimensional fluorescence signal intensity data to the regression parameter line and then assigning a colourmap value to each such voxel in the three-dimensional image space based on the mapping; and
   rendering the voxels in the three-dimensional image in colours related to the assigned colourmap values resulting in a visualisation of colocalisation of the fluorescence data in the three-dimensional image.

2. The method as claimed in claim 1, wherein assigning a colourmap value to each voxel further includes:
   assigning a colourmap value based on a level of combined channel signal intensities to emphasise greater signal intensities; and
   limiting assigning colourmap values to voxels where both channel signal intensities are above defined respective channel intensity thresholds.

3. The method as claimed in claim 1, wherein mapping applies a perpendicular projection of the signal intensity data for a voxel onto the regression parameter; and
   wherein assigning a colourmap value to each voxel includes:
   assigning a colourmap value based on a position along the regression parameter; and
   attenuating the colourmap value based on an increased distance of the projection to emphasize positively correlated intensities.

4. The method as claimed in claim 1, wherein assigning a colourmap value to each voxel further includes:
   excluding assigning colourmap values to outliers in the data, wherein outliers are signal intensity data that is greater than a predetermined distance threshold from the regression parameter.

5. The method as claimed in claim 4, wherein the mapping includes a statistical filter to apply a projection distance threshold to capture a statistical population of voxels having intensities above defined respective channel intensity thresholds.

6. The method as claimed in claim 1, wherein the regression parameter has an upper limit corresponding to a maximum signal intensity of at least one of the first and second fluorescence channels and a lower limit corresponding to a minimum signal intensity of at least one of the first and second fluorescence channels, and wherein assigning colourmap values is applied linearly between the parameter upper limit and lower limit along the regression parameter.

7. The method as claimed in claim 6, wherein signal intensity data having a mapped value that exceeds the upper limit of the regression parameter is assigned a colourmap value corresponding to the upper threshold value and signal intensity data having a mapped value that is less than the lower limit of the regression parameter is assigned a colourmap value corresponding to the lower threshold value.

8. The method as claimed in claim 1, wherein the method includes:
applying a threshold filter to exclude signal intensity data corresponding to background noise or non-correlated signal intensity data; wherein background noise comprises signal intensity data below a threshold filter minimum, and non-correlated signal intensity data comprises data from at least one of the first and second fluorescence channels which is below a threshold filter minimum.

9. A computer system comprising:
a processor and a memory configured to provide computer program instructions to the processor to execute functions of components:
an accessing component for accessing multi-dimensional signal intensity data in the form of fluorescence data in a three-dimensional image space including signal intensity data for a first fluorescence channel and a second fluorescence channel associated with each voxel of a three-dimensional image;
a regression calculating component for calculating a regression as an errors-in-variables regression on the fluorescence data to generate a regression parameter corresponding to a degree of correlation between the signal intensity data obtained from the first and second fluorescence channels, with values of the regression parameter represented by a best fit line of points on a graph with axes representing the signal intensity values of the first and second fluorescence channels and with colourmap values varying along the regression parameter line;
a mapping component for mapping, for each voxel, the in the three-dimensional image space signal intensity to the regression parameter line;
a colourmap value assigning component for assigning a colourmap value to each such voxel in the three-dimensional space based on the mapping; and
a rendering component for rendering the voxels in the three-dimensional image for display on a computer display in colours related to the assigned colourmap values resulting in a visualisation of colocalisation of the fluorescence data directly in the three-dimensional image space.

10. The system as claimed in claim 9, wherein the colourmap value assigning component includes:
assigning a colourmap value based on a level of combined channel signal intensities; and
limiting assigning colourmap values to voxels where both channel signal intensities are above defined respective channel intensity thresholds.

11. The system as claimed in claim 9, wherein the colourmap value assigning component includes:
assigning colourmap values excluding outliers in the data, wherein outliers are signal intensity data that is greater than a predetermined distance threshold from the regression parameter.

12. The system as claimed in claim 9, wherein the mapping component includes a statistical filter to apply a projection distance threshold to capture a statistical population of voxels having intensities above defined respective channel intensity thresholds.

13. The system as claimed in claim 9, including:
a threshold filter component to exclude signal intensity data corresponding to background noise or non-correlated signal intensity data; wherein background noise comprises signal intensity data below a threshold filter minimum, and non-correlated signal intensity data comprises data from at least one of the first and second fluorescence channels which is below a threshold filter minimum.

14. A computer program product comprising a non-transitory computer-readable medium having stored computer-readable program code for performing the steps of:
assessing multi-dimensional signal intensity data in the form of fluorescence data in a three-dimensional image space including signal intensity data for a first fluorescence channel and a second fluorescence channel associated with each voxel of a three-dimensional image;
calculating a regression as an errors-in-variables regression on the fluorescence data to generate a regression parameter corresponding to a degree of correlation between the signal intensity data obtained from the first and second fluorescence channels, with values of the regression parameter represented by a best fit line of points on a graph with axes representing the signal intensity values of the first and second fluorescence channels and with colourmap values varying along the regression parameter line;
mapping, for each voxel, the multi-dimensional fluorescence signal intensity data to the regression parameter line and then assigning a colourmap value to each such voxel in the three-dimensional image space based on the mapping; and
rendering the voxels in the three-dimensional image in colours related to the assigned colourmap values resulting in a visualization of colocalization of the fluorescence data directly in the three-dimensional image space.

* * * * *